United States Patent
Jung

(10) Patent No.: US 6,650,083 B2
(45) Date of Patent: Nov. 18, 2003

(54) SPEED CONTROL APPARATUS OF SYNCHRONOUS RELUCTANCE MOTOR AND METHOD THEREOF

(75) Inventor: Dal Ho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 113 days.

(21) Appl. No.: 09/946,517

(22) Filed: Sep. 6, 2001

(65) Prior Publication Data

US 2002/0060547 A1 May 23, 2002

(30) Foreign Application Priority Data

Oct. 19, 2000 (KR) .................................. 2000-0061632

(51) Int. Cl.[7] .............................. H02P 1/46; H02P 3/18; H02P 5/28; H02P 7/36
(52) U.S. Cl. ....................................................... 318/701
(58) Field of Search ................................ 318/701–724, 318/700

(56) References Cited

U.S. PATENT DOCUMENTS

| 4,740,738 A | 4/1988 | El-Antably et al. |
| 5,043,643 A | 8/1991 | Hedlund et al. |
| 5,448,149 A | 9/1995 | Ehsani et al. |
| 5,994,870 A | * 11/1999 | Kaneko et al. ............. 318/798 |
| 6,414,462 B2 | * 7/2002 | Chong ......................... 318/701 |
| 2001/0028236 A1 | 10/2001 | Cheong |

FOREIGN PATENT DOCUMENTS

WO    WO 94/05077    3/1994

* cited by examiner

Primary Examiner—Jeffrey Donels
(74) Attorney, Agent, or Firm—Birch, Stewart, Kolasch & Birch, LLP

(57) ABSTRACT

A speed control apparatus of a synchronous reluctance motor includes: a rectifier for receiving an AC power and rectifying it to a DC power; an inverter for receiving a DC power to an AC power and supplying it to a synchronous reluctance motor; a detecting unit for detecting a current and a voltage supplied to the synchronous reluctance motor, operating the generated induction voltage and the estimated induction voltage generated from the current, and generating an estimated angular velocity of the synchronous reluctance motor; and a controller for receiving the estimated angular velocity and the velocity command value inputted by a user and controlling the speed of the synchronous reluctance motor through the inverter. Since the speed of the synchronous reluctance motor is controlled by detecting the current and the voltage supplied to the synchronous reluctance motor, rather than using an encoder or a hall sensor, a production cost of the synchronous reluctance motor can be reduced.

17 Claims, 5 Drawing Sheets

SPEED CONTROL APPARATUS OF SYNCHRONOUS RELUCTANCE MOTOR AND METHOD THEREOF

BACKGROUND OF THE INVENTION

1. Field of the Invention

The present invention relates to a synchronous reluctance motor (SynRM), and more particularly, to a speed control apparatus of a synchronous reluctance motor.

2. Description of the Background Art

FIG. 1 is a sectional view of a general synchronous reluctance motor (SynRM), in which reference numeral 100 denotes a stator, 101 denotes slots of the stator 100, and 200 denotes a rotor.

FIG. 2 is a sectional view of the rotor of FIG. 1, in which reference numeral 201 denotes grooves which differentiate magnetic flux passing 'd' axis and 'q' axis, 202 denotes a pinhole with silicon ferrite filled therein.

A rotational speed of the synchronous reluctance motor with such a structure is controlled by a synchronous reluctance motor controlling apparatus which detects a position of the rotor.

FIG. 3 shows the construction of the speed controlling apparatus of the synchronous reluctance motor in accordance with a conventional art.

As shown in FIG. 3, a rectifier 320 receiving an AC power 310 and rectifying it to a DC power, an inverter 330 for converting the DC power to three phase currents and driving the synchronous reluctance motor 340, a controlling unit 350 controlling the inverter 330, and a detecting unit 360 detecting a rotational speed or the synchronous reluctance motor 340.

The detecting unit 360 includes a current detector 361 detecting two phase currents among the three phase currents flowing to the synchronous reluctance motor 340, a rotor position detector 363 detecting angular velocity of the rotor of the synchronous reluctance motor 340, a magnetic flux angle operating unit 362 receiving the angular velocity ($\omega_r$) of the rotor outputted from the rotor position detector 363 and computing a magnetic flux angle ($\theta$), and a coordinate converter 364 receiving magnetic flux angle ($\theta$) and the detected two phase currents and generating a magnetic flux current value ($i_{ds}$) of the rotor and a current value $i_{qs}$ of torque.

The controlling unit 350 includes a comparator 358 receiving the angular velocity value ($\omega_r$) and a velocity command value ($\omega_r^*$) from the rotor position detector 363 and computing a difference velocity command value, a speed controller 356 receiving the different velocity command value and generating a current command value for torque ($l_{qs}^*$), a comparator 354 receiving the current command value for torque ($l_{qs}^*$) and a current value for torque ($i_{qs}$) outputted from the coordinate converter 364 of the detecting unit 360 and generating a difference current command value for torque, a magnetic flux command generator 357 generating a current command value for magnetic flux ($i_{ds}^*$) to differentiate a positive torque region and a positive output region according to the rotor angular velocity value ($\omega_r$) outputted from the rotor position detector 363 of the detecting unit 360, a comparator 355 receiving the current command value ($i_{ds}^*$) and the current value for magnetic flux ($i_{ds}$) outputted from the coordinate converter 364 of the detecting unit 360 and generating a difference current command value for magnetic flux, a magnetic flux controller 353 receiving the difference current command value for magnetic flux and generating a magnetic flux command value; a current controller 352 receiving the command value for magnetic flux and the difference current command value for torque and generating a voltage command value for torque ($V_{qs}^*$) and a voltage command value for magnetic flux ($V_{ds}^*$), and a voltage generator 351 receiving the voltage command value for torque ($V_{qs}^*$), the voltage command value for magnetic flux ($V_{ds}^*$) and the magnetic flux angle ($\theta$), generating three phases voltage command values ($V_{as}$, $V_{bs}$, $V_{cs}$) and outputting them to the inverter 330.

The operation of the conventional speed control apparatus of synchronous reluctance motor constructed as described above will now be explained.

In order to control the rotation speed of the synchronous reluctance motor 340 according to the velocity command value ($\omega_r^*$), when the velocity command value ($\omega_r^*$) is inputted to the controller 350, the comparator 358 of the controlling unit 350 compares the velocity command value ($\omega_r^*$) and a rotor angular velocity value ($\omega_r$) outputted from the rotor position detector 363 and outputs a generated error to the speed controller 356.

Then, the comparator 355 of the controlling unit 350 receives the angular velocity value ($\omega_r$), receives the current command value for magnetic flux ($i_{ds}^*$) generated from the magnetic flux command generator 357 and the current value for magnetic flux ($i_{ds}$) outputted from the coordinate converter 364, compares them to generate a difference current command value for magnetic flux and outputs it to the magnetic flux controller 353.

The current controller 352 receives the difference current command value for torque and the magnetic flux command value outputted from the magnetic flux controller 353, generates a voltage command value for torque ($V_{qs}^*$) and a voltage command value ($V_{ds}^*$) for magnetic flux and outputs them to the voltage generator 351.

Then, the voltage generator 351 receives the voltage command value for torque ($V_{qs}^*$), the voltage command value for magnetic flux ($V_{ds}^*$) and the magnetic flux ($\theta$) outputted form the magnetic flux angle operating unit 362 of the detecting unit 360, and outputs three phase voltage command values ($V_{as}$, $V_{bs}$, $V_{cs}$) for switching ON/OFF of the inverter 330 to the inverter 330.

Thus, the synchronous reluctance motor 340 is rotated by the three phase AC powers outputted from the inverter 330.

The coordinate converter 364 of the detecting unit 360 converts an a-phase current ($l_{as}$) and a b-phase current ($i_{bs}$) detected from the current detector 361 which detects a current flowing from the inverter 330 to the synchronous reluctance motor 340 into a d-axis current or a current value for magnetic flux ($i_{ds}$) and a q-axis current or a current value for torque ($i_{qs}$).

The rotor position detector 363 uses an encoder or a hall sensor to detect a position of the rotor.

The conventional speed control apparatus of the synchronous reluctance motor, however, has the following problems.

That is, in order to control the rotation speed of the synchronous reluctance motor, an encoder or the hall sensor is to be used to detect a position of the rotor of the synchronous reluctance motor, which causes an increase of a cost of a product. Above all, the rotor position detector is not suitable to a compressor of a refrigerator, an air-conditioner or a heater.

SUMMARY OF THE INVENTION

Therefore, an object of the present invention is to provide a speed control apparatus of a synchronous reluctance motor that is capable of controlling a rotation speed of a synchronous reluctance motor.

Another object of the present invention is to provide a speed control apparatus that is capable of controlling a rotation speed of a synchronous reluctance motor by detecting a current and a voltage supplied to a synchronous reluctance motor.

To achieve these and other advantages and in accordance with the purpose of the present invention, as embodied and broadly described herein, there is provided to a speed control apparatus of a synchronous reluctance motor including: a rectifier for receiving an AC power and rectifying it to a DC power; an inverter for receiving a DC power to an AC power and supplying it to a synchronous reluctance motor; a detecting unit for operating an induction voltage generated by detecting a current and a voltage supplied to the synchronous reluctance motor and the estimated induction voltage generated from the current, and generating an estimated angular velocity of the synchronous reluctance motor; and a controller for receiving the estimated angular velocity and the velocity command value inputted by a user and controlling the speed of the synchronous reluctance motor through the inverter.

To achieve the above object, there is also provided a speed control method of a synchronous reluctance motor including the steps of: detecting a current supplied to a synchronous reluctance motor; detecting a voltage supplied to the synchronous reluctance motor; operating an induction voltage generated by operating the detected current and an estimated induction voltage generated from the current, and generating an estimated angular velocity of the synchronous reluctance motor; and controlling the speed of the synchronous reluctance motor according to the estimated angular velocity and a velocity command value inputted by a user.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
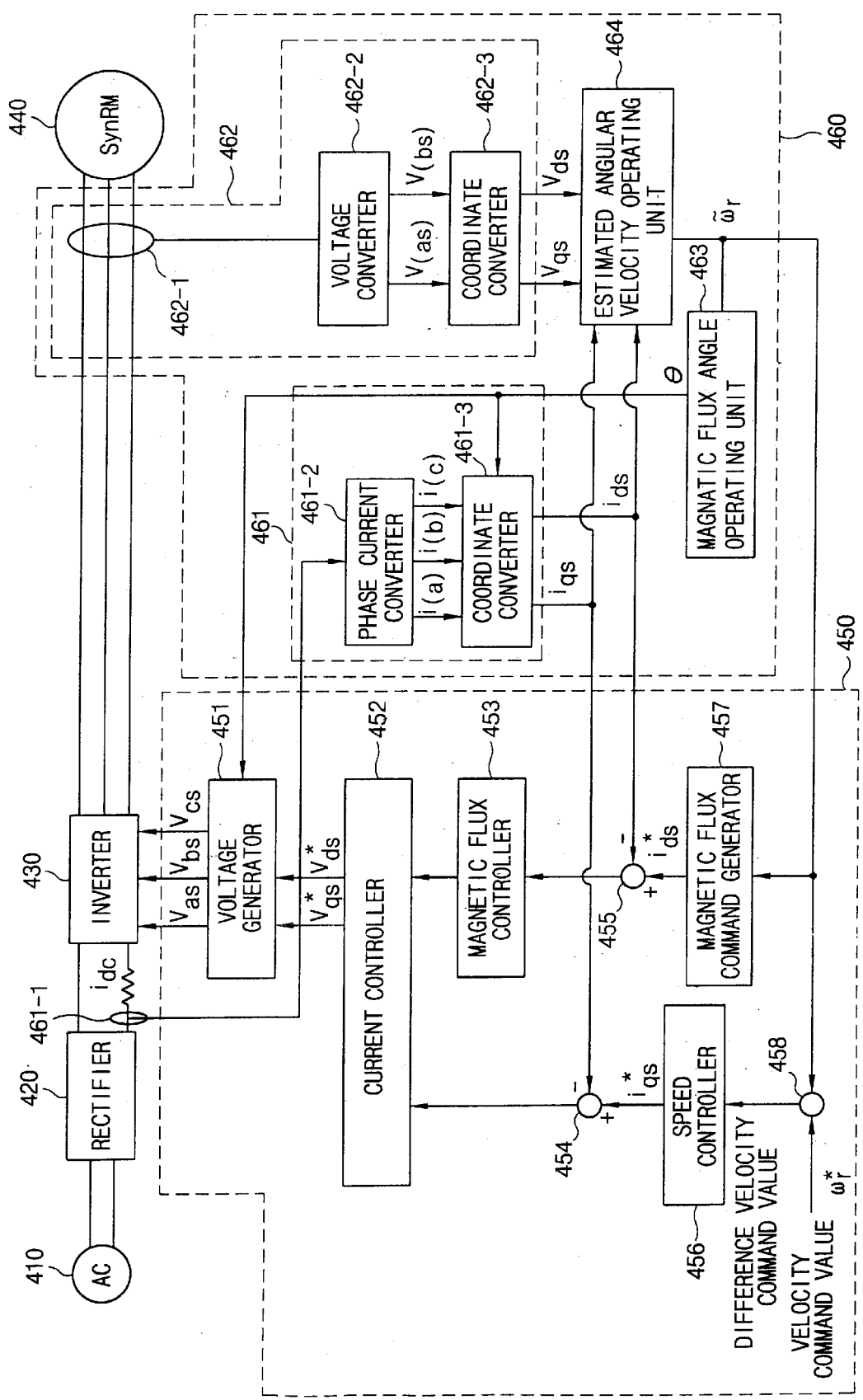
FIG. 4 illustrates the construction of a speed control apparatus of a synchronous reluctance motor in accordance with a preferred embodiment of the present invention.

FIG. 4 illustrates the construction of a speed control apparatus of a synchronous reluctance motor in accordance with a preferred embodiment of the present invention.

As shown in FIG. 4, a speed control apparatus of a synchronous reluctance motor includes a rectifier 420 for receiving an AC power 410 and rectifying it to a DC power; an inverter 430 for changing the DC power to three phase currents to drive a synchronous reluctance motor; a controller for controlling the inverter 430; and a detecting unit 460 for detecting a speed of the synchronous reluctance motor 440.

The detecting unit 460 includes a current detecting unit 461 for detecting a current ($i_{dc}$) flowing from the rectifier 420 to the inverter 430 and generating a current value for torque ($i_{qs}$) and a current value for magnetic flux ($i_{ds}$); a voltage detecting unit 462 for detecting a voltage inputted from the inverter 430 to the synchronous reluctance motor 440 and generating a voltage value for torque ($V_{qs}$) and a voltage value for magnetic flux ($V_{ds}$); an estimated angular velocity operating unit 464 for receiving the current value for torque ($I_{qs}$), the current value of magnetic flux ($i_{ds}$), the voltage value for torque ($V_{qs}$) and the voltage value of magnetic flux ($V_{ds}$) and operating an estimated angular velocity value ($\omega_r$); and a magnetic flux angle operating unit 463 for receiving the estimated angular velocity value ($\omega_r$) and operating a magnetic flux angle ($\theta$).

The voltage detecting unit 462 includes a voltage detector 462-1 for detecting a voltage inputted from the inverter 430 to the synchronous reluctance motor 440; a voltage converter 462-2 for receiving the signal outputted from the voltage detector 462-1 and generating a first phase voltage value V(as) and a second voltage value V(bs); and a coordinate converter 462-3 for receiving the first phase voltage value V(as) and the second phase voltage value V(bs) and generating a voltage value for torque $V_{qs}$ and a voltage value of magnetic flux $V_{ds}$.

The current detecting unit 461 includes a current detector 461-1 for detecting a current ($i_{dc}$) flowing from the rectifier 420 to the inverter 430; a phase current converter 461-2 for receiving the signal outputted from the current detector 461-1 and generating three phase current values i(a), i(b) and i(c); and a coordinate converter 461-3 for receiving the three phase current values I(a), I(b) and I(c) and generating a current value for torque $i_{qs}$ and a current value for magnetic flux $i_{ds}$.

The controller 450 includes a comparator 458 for receiving an estimated angular velocity value ($\omega_r$) and a velocity command value ($\omega_r^*$) from the estimated angular velocity operating unit 464 of the detecting unit 460 and operating a difference velocity command value; a speed controller 456 for receiving the difference velocity command value and generating a current command value for torque $i_{qs}^*$; a comparator 454 for receiving the current command value for torque $i_{qs}$* and the current value for torque $i_{qs}$ outputted from the coordinate converter 461-3 of the detecting unit 460 and generating a difference current command value for torque; a magnetic flux command generator 457 for receiving the estimated angular velocity value ($\omega_r$) and the velocity command value ($\omega_r$*) outputted from the estimated angular velocity operating unit 464 of the detecting unit 460 and generating a current command value for magnetic flux $i_{qs}$*; a comparator 455 for receiving the current command value for magnetic flux $i_{qs}$*; and the current value for magnetic flux $i_{ds}$ outputted from the coordinate converter 461-3 of the current detecting unit 461 and generating a difference current command value for magnetic flux; a magnetic flux controller 453 for receiving the difference current command value for magnetic flux and generating a magnetic flux command value; a current controller 452 for receiving the command value for magnetic flux and the difference current command value for torque and generating a voltage command value for torque $V_{qs}$* and a voltage command value for magnetic flux $V_{ds}$*; and a voltage generator 451 for receiving the voltage command value for torque $V_{qs}$*, the voltage command value for magnetic flux $V_{ds}$* and the magnetic flux angle ($\theta$), generating the three phase voltage values $V_{as}$, $V_{bs}$ and $V_{cs}$ and outputting them to the inverter 430.

Figure 5:
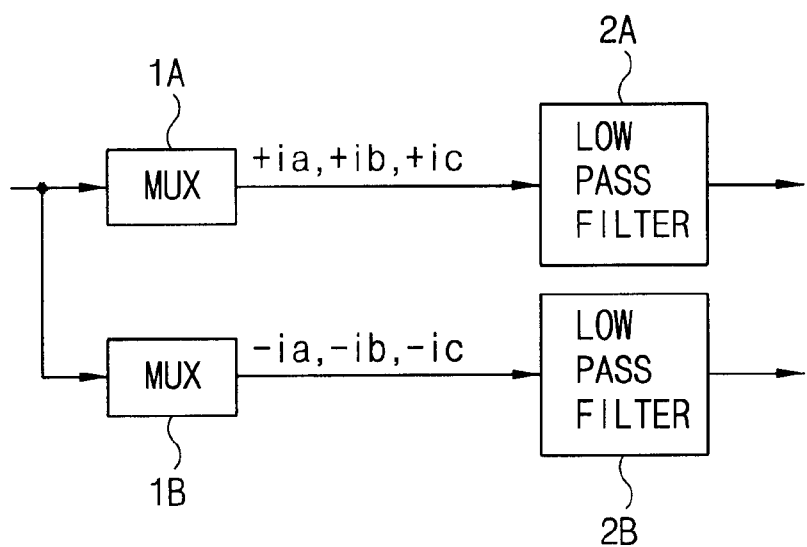
FIG. 5 is a detailed view showing the construction of a phase current converter of FIG. 4 in accordance with the preferred embodiment of the present invention.

FIG. 5 is a detailed view showing the construction of the phase current converter of FIG. 4 in accordance with the preferred embodiment of the present invention.

As shown in FIG. 5, the phase current converter 461-2 includes a first multiplexer 1A for receiving a signal outputted from the current detector 461-1 and outputting positive phase currents +ia, +ib and +ic according to a pulse width modulation state; a second multiplexer 1B for outputting negative phase currents −ia, −ib and −ic; a first low pass filter 2A for receiving the positive phase currents +ia, +ib and +ic and canceling a noise; and a second low pass filter 2B for receiving the negative phase currents −ia, −ib and −ic and canceling a noise.

Figure 6:
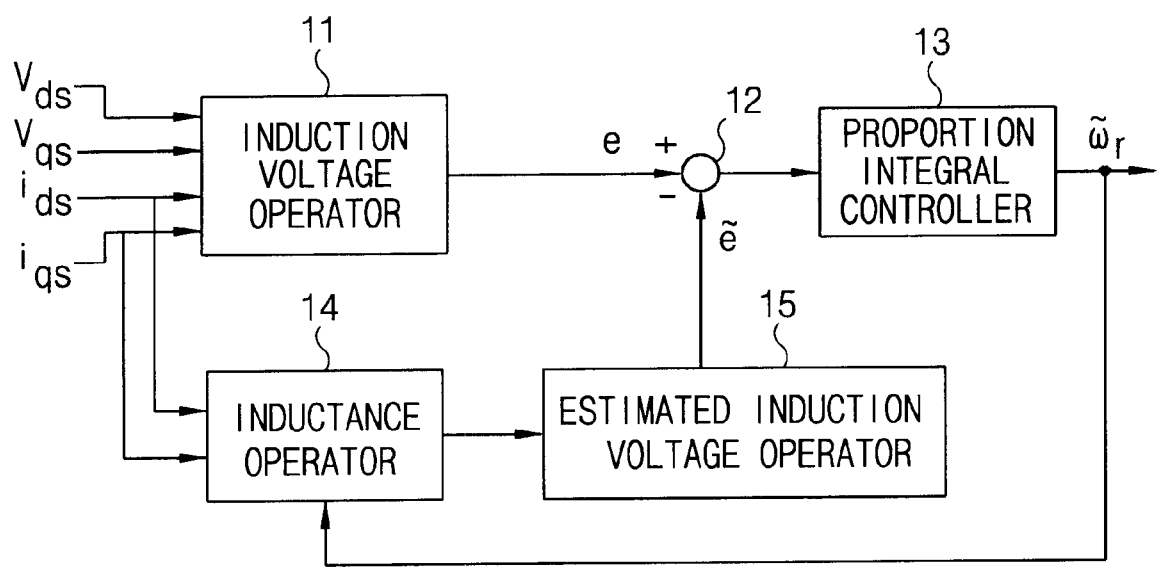
FIG. 6 is a detailed view showing an estimated angular velocity operating unit of FIG. 4 in accordance with the preferred embodiment of the present invention.

FIG. 6 is a detailed view showing the estimated angular velocity operating unit of FIG. 4 in accordance with the preferred embodiment of the present invention.

As shown in FIG. 6, the estimated angular velocity operating unit 464 includes an induction voltage operator 11 for receiving the current value for torque $i_{qs}$, the current value for magnetic flux $i_{ds}$, the voltage value for torque $V_{qs}$ and the voltage value $V_{ds}$ for magnetic flux; an inductance operator 14 for receiving the current value for torque $i_{qs}$ and the current value for magnetic flux $i_{ds}$ and operating an inductance for magnetic flux Ld and an inductance for torque Lq; an estimated induction voltage operator 15 for receiving the inductance from the inductance operator 14 and operating an estimated induction voltage value ($\hat{e}$); a comparator 12 for comparing the induction voltage ($e$) outputted from the induction voltage operator 11 and the estimated induction voltage value ($\hat{e}$) outputted from the estimated induction voltage operator 15 and generating an error induction voltage value; and a proportional integral controller 13 for receiving the error and operating the estimated angular velocity value ($\omega_r$).

The speed control apparatus of a synchronous reluctance motor constructed as described above will now be explained.

Figure 1:
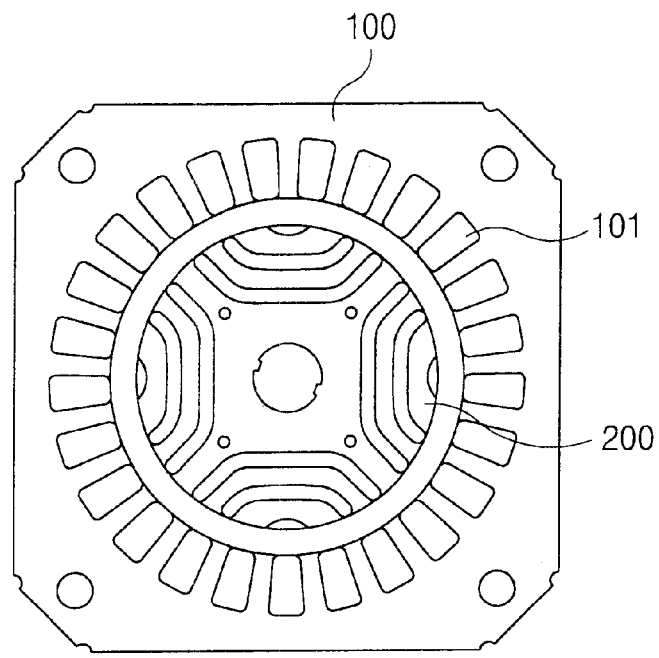
FIG. 1 is a sectional view of a general synchronous reluctance motor.
Figure 2:
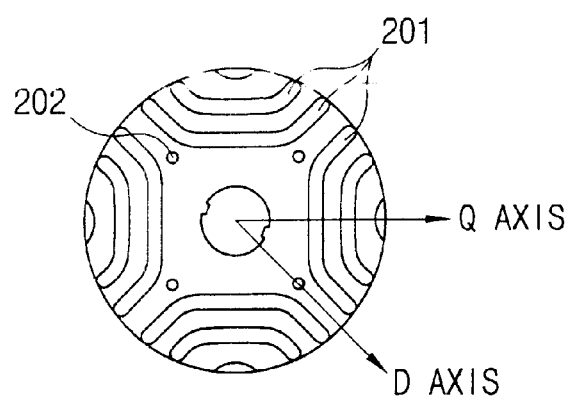
FIG. 2 is a sectional view of a rotor of FIG. 1.
Figure 3:
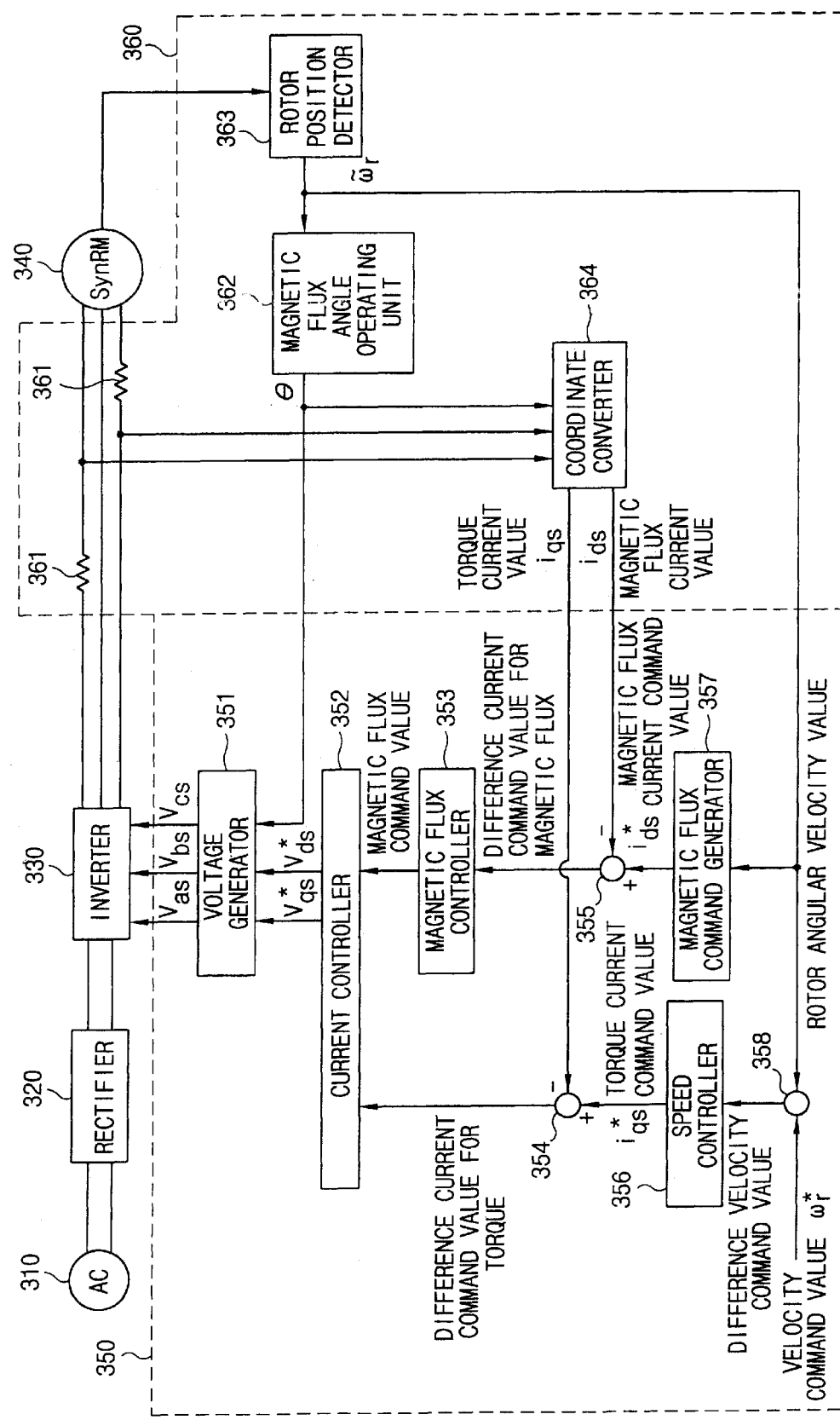
FIG. 3 illustrates the construction of a speed control apparatus of a synchronous reluctance motor in accordance with a conventional art.

With reference to FIG. 2, first, in order to control the speed of the synchronous reluctance motor, positions of a 'd' and a 'q' axes are detected by the magnetic flux of each winding of a stator. That is, since the sizes of reluctances are different in the 'd' axis and the 'q' axis, the speed of the synchronous reluctance motor can be controlled by detecting them.

Figure 7:
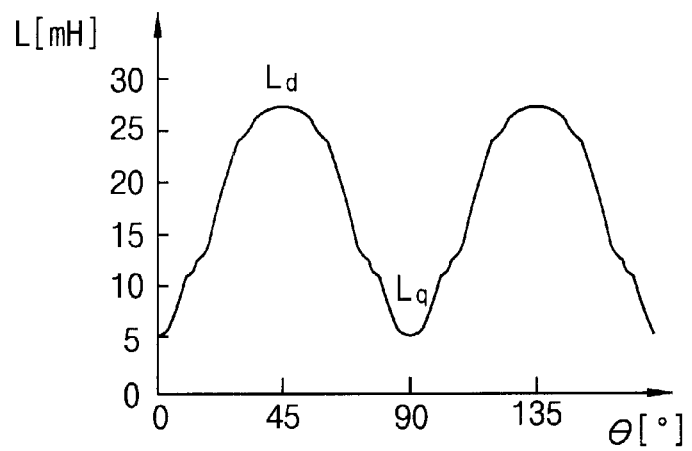
FIG. 7 is a graph showing an inductance variation of the synchronous reluctance motor according to an operation of the speed control apparatus of a synchronous reluctance motor in accordance with the preferred embodiment of the present invention.

FIG. 7 is a graph showing an inductance variation of the synchronous reluctance motor according to an operation of the speed control apparatus of a synchronous reluctance motor in accordance with the preferred embodiment of the present invention.

When the speed of the synchronous reluctance motor 440 is to be controlled, the positions of 'd' axis and 'q' axis should be detected in each phase of the winding of the stator.

For this purpose, when the rotor of the synchronous reluctance motor is rotated, the inductance is varied according to the rotation angle. Thus, an input voltage and current of the stator of the synchronous reluctance motor is detected according to the inductance variation and substituted for equation (1), so that a position of the rotor can be obtained, and the speed of the rotor can be obtained by using the computed value, and accordingly, the speed of the rotor can be controlled.

When 'q' axis of the rotor is set as a reference axis, a magnetic flux is the greatest at 'd' axis positioned at an angle forming a 45° difference to 'q' axis.

At this time, a torque ($T_e$) of the synchronous reluctance motor is in proportion to the difference ($L_d$−$L_q$) of the reluctance and the multiplication of the current value for magnetic flux $i_{ds}$ of the stator and the current value for torque $i_{qs}$.

$$T_e = \frac{3}{2} \cdot i_{ds} \cdot i_{qs} \cdot (L_d - L_q) \quad (1)$$

A voltage equation of the synchronous reluctance motor is expressed in equations (2) and (3) shown below:

$$V_{ds} = r_s i_{ds} + \frac{d(\lambda_{qs})}{dt} - \omega_r \lambda_{qs} \quad (2)$$

$$V_{qs} = r_s i_{qs} + \frac{d(\lambda_{ds})}{dt} + \omega_r \lambda_{ds} \quad (3)$$

wherein, $V_{ds}$ indicates a stator voltage of 'd' axis, $V_{qs}$ indicates a stator voltage of 'q' axis, $r_s$ indicates a stator resistance, $i_{ds}$ indicates a stator current of 'd' axis, $i_{qs}$ indicates a stator current of 'q' axis, $\lambda_{ds}$ and $\lambda_{qs}$ indicate magnetic fluxes of 'D' axis and 'Q' axis, and $\omega_r$ indicates a rotor angular velocity value of the motor.

Figure 8:
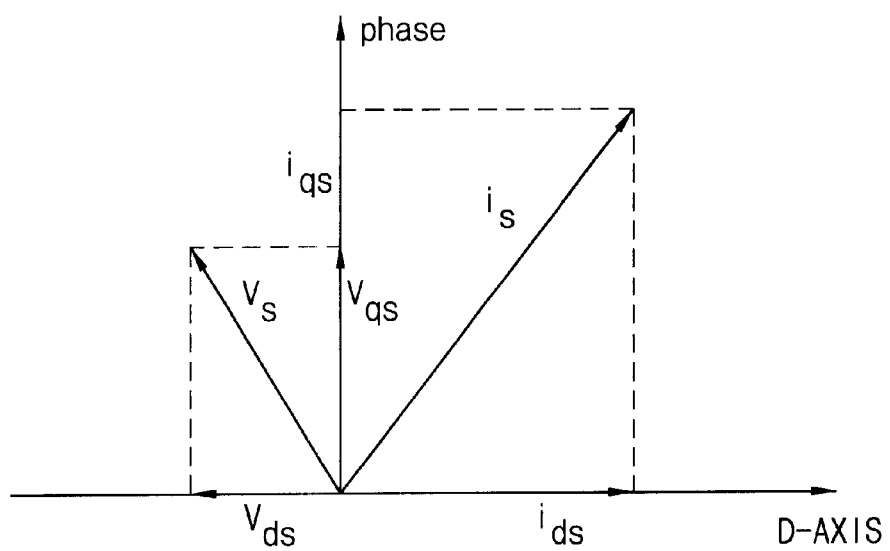
FIG. 8 is a graph showing a current/voltage vector formed at the synchronous reluctance motor according to the according to an operation of the speed control apparatus of a synchronous reluctance motor in accordance with the preferred embodiment of the present invention.

Since $\lambda_{ds}$=Ldis and $\lambda_{qs}$=Lqis, the inductances Ld and Lq of 'd' axis and 'q' axis can be computed by detecting a voltage and a current. The variation of the computed amount corresponds to the position of the rotor of the synchronous reluctance motor, and the variation amount of the inductance is as shown in FIG.7. The correlation between the current/voltage vectors formed at the synchronous reluctance motor is as shown in FIG. 8.

The speed control apparatus of the synchronous reluctance motor in accordance with the present invention will now be described on the basis of the method for controlling the speed of the synchronous reluctance motor.

With reference to FIG. 4, when the rectifier 420 converts an AC power to a DC voltage ($V_{dc}$) and inputs it to the inverter 430, the inverter 430 converts the inputted DC voltage to an AC voltage under the control of the controller 450 and supplies it to the synchronous reluctance motor 440, thereby driving the synchronous reluctance motor 440.

At this time, the current detector 461-1 of the detecting unit 460 detects a current flowing from the rectifier 420 to an inverter 430 and outputs it to the phase current converter 461-2. Then, the phase current converter 461-2 converts the three phase currents ia, ib and ic received from the current detector 461-1 by using a space vector method to perform a pulse width modulation in the following manner.

That is, as shown in FIG. 5, the three phase currents ia, ib and ic outputted from the current detector 461-1 is divided into 001=+ia, 010=+ib, 100=+ic, 110=−ia, 101=−ib, 011=−ic by the multiplexer (1A and 1B). Accordingly, when a current flowing at a DC link between the rectifier 420 and the inverter 430 is detected, the current detecting unit 461 can detect the current flowing to each phase of the rotor of the synchronous reluctance motor.

When the phase current converter 461-2 computes the phase current of three phases and outputs it to the coordinate converter 461-3, the coordinate converter 461-3 converts it into 'd' axis or a current value for magnetic flux $i_{ds}$ and 'q' axis or a current value for torque $i_{qs}$, and then outputs it to the comparators 455 and 454.

The voltage detector 462-1 of the voltage detecting unit 462 detects a voltage supplied from the inverter 430 to the synchronous reluctance motor 440 and outputs it to the voltage converter 462-2, the voltage converter 462-2 detects a first phase voltage value V(as) and a second phase voltage value V(cs) from the inputted voltage and outputs them to the coordinate converter 462-3.

Then, the coordinate converter 462-3 converts them into 'd' axis stator voltage $V_{ds}$ and 'q' axis stator voltage $V_{qs}$ and outputs them to the estimated angular velocity operating unit 464.

As shown in FIG. 6, the induction voltage operator 11 of the estimated angular velocity operating unit 464 receives the current value for torque $i_{qs}$, the current value for magnetic flux $i_{ds}$, the voltage value $V_{qs}$ for torque and the voltage value for magnetic flux $V_{ds}$, operates the induction voltage ($\tilde{e}$) and outputs it to the comparator 12.

The estimated induction voltage operator 15 receives the current value for torque $i_{qs}$, the current value ids for magnetic flux and the estimated angular velocity value ($\omega_r$), receives 'd' axis inductance Ld and 'q' axis inductance Lq from the inductance operator 14, operates an estimated induction voltage ($\hat{e}$) and outputs it to the comparator 12.

Then, the comparator 12 generates an error of the induction voltage and outputs it to the proportional integral controller 13, and then, the proportional integral controller 13 generates an estimated angular velocity value ($\hat{e}$) and outputs it to the magnetic flux angle operating unit 463, the magnetic flux command generator 457 and the comparator 458.

Then, in order to control the rotation speed of the synchronous reluctance motor, the comparator 458 of the controller 450 receives the velocity command value ($\omega_r$*) and the estimated angular velocity value ($\omega_r$) and outputs a generated error to the speed controller 456.

Then, the comparator 454 compares the current value for torque $i_{qs}$ outputted from the coordinate converter 461-3 of the current detecting unit 461 and the current command value for torque $i_{qs}$* outputted from the speed controller 456, and generates a difference current command value for torque.

The comparator 455 receives the estimated angular velocity value ($\omega_r$) and also receives the current command value for magnetic flux ids* from the magnetic flux command generator 457 and the current value for magnetic flux ids from the coordinate converter 461-3, compares them to generate a difference current command value for magnetic flux, and outputs it to the magnetic flux controller 453.

The current controller 452 receives the difference current command value for torque outputted from the comparator 454 and the magnetic flux command value outputted from the magnetic flux controller 453, generates a voltage command value for torque $V_{qs}$* and a voltage command value for magnetic flux $V_{as}$* by using a rotating coordinate system, and outputs them to the voltage generator 451.

Then, the voltage generator 451 receives the voltage command value for torque $V_{qs}$*, the voltage command value for magnetic flux $V_{as}$* and the magnetic flux angle ($\theta$) outputted from the magnetic flux operating unit 463, generates three phase voltage command values $V_{as}$, $V_{bs}$ and $V_{cs}$ for switching ON/OFF of the inverter 430, and outputs them to the inverter 430.

Accordingly, the current and the voltage supplied to the synchronous reluctance motor 440 are detected, and then by using the estimated angular velocity generated therefrom, the speed of the synchronous reluctance motor 440 is controlled.

As so far described, according to the speed control apparatus of a synchronous reluctance motor of the present invention, since the speed of the synchronous reluctance motor is controlled by detecting the current and the voltage supplied to the synchronous reluctance motor, rather than using an encoder or a hall sensor, a production cost of the synchronous reluctance motor can be reduced.

In addition, a phase current is computed by one current detector, to thereby control the speed of the synchronous reluctance motor.

Moreover, the speed of a compressor where a rotor position detector can be hardly installed, such as a refrigerator, an air-conditioner or a heater, can be easily controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A speed control apparatus of a synchronous reluctance motor comprising:

a rectifier for receiving an AC power and rectifying it to a DC power;

an inverter for receiving a DC power to an AC power and supplying it to a synchronous reluctance motor;

a detecting unit for operating an induction voltage generated by detecting a current and a voltage supplied to the synchronous reluctance motor and the estimated induction voltage generated from the current, and generating an estimated angular velocity of the synchronous reluctance motor; based on the induction voltage and a controller for receiving the estimated angular velocity and the velocity command value inputted by a user and controlling the speed of the synchronous reluctance motor through the inverter.

2. The apparatus of claim 1, wherein the detecting unit comprises:

a current detecting unit for detecting a current flowing between the rectifier and the inverter and generating currents corresponding to 'd' axis and 'q' axis of a rotor;

a voltage detecting unit for detecting a voltage supplied from the inverter to the synchronous reluctance motor and generating a voltage corresponding to 'd' axis and 'q' axis of the rotor; and an estimated angular velocity operating unit for receiving the current corresponding to 'd' axis and 'q' axis and the voltage corresponding to 'd' axis and 'q' axis and operating the estimated angular velocity.

3. The apparatus of claim 2, wherein the current detecting unit comprises:

a current detector for detecting a current flowing between the rectifier and the inverter;

a phase current converter for receiving the detected current and converting it to three phase currents; and a coordinate converter for receiving and detecting the three phase currents and converting them to currents corresponding to 'd' axis and 'q' axis.

4. A speed control apparatus of a synchronous reluctance motor comprising:

a rectifier for receiving an AC power and rectifying it to a DC power;

an inverter for receiving a DC power to an AC power and supplying it to a synchronous reluctance motor;

a detecting unit for operating an induction voltage generated by detecting a current and a voltage supplied to the synchronous reluctance motor and the estimated induction voltage generated from the current, and generating an estimated angular velocity of the synchronous reluctance motor, wherein the detecting unit comprises:

a phase current converter for receiving the detected current and converting it to three phase currents wherein the phase current converter comprises:

a first multiplexer for receiving the detected current and outputting positive three phase currents (+ia, +ib,+ic) according to a pulse width modulation state;

a second multiplexer for outputting negative three phase currents (−ia, −ib, −ic);

a first low pass filter for receiving the positive three phase currents and canceling a noise; and a second low pass filter for receiving the negative three phase currents and canceling a noise; and a controller for receiving the estimated angular velocity and the velocity command value inputted by a user and controlling the speed of the synchronous reluctance motor through the inverter.

5. The apparatus of claim 2, wherein the voltage detecting unit comprises:

a voltage detector for detecting a voltage supplied from the inverter to the synchronous reluctance motor;

a voltage converter for receiving the signal detected from the voltage detector and converting it to two phase voltages; and a coordinate converter for receiving the two phase voltages and generating voltages corresponding to 'd' axis and 'q' axis.

6. A speed conrol apparatus, of a synchronous reluctance motor comprising:

a rectifier for receiving and AC power and rectifying it to a DC power;

an inverter for receiving a DC power to an AC power and supplying it to a synchronous reluctance motor;

a detecting unit for operating an induction voltage generated by detecting a current and a voltage supplied to the synchronous reluctance motor and the estimated induction voltage generated from the current, and generating an estimated angular velocity of the synchronous reluctance motor, wherein the detecting unit comprises:

an estimated angular velocity operating unit for operating the estimated angular velocity, wherein the estimated angular velocity operating unit comprises:

an induction voltage operator for receiving currents corresponding to 'd' axis and 'q' axis and voltages corresponding to 'd' axis and 'q' axis and generating induction voltages;

an estimated induction voltage generator for receiving the currents corresponding to 'd' axis and 'q' axis and the estimated angular velocity, and generating an estimated induction voltage; and an estimated velocity generator for receiving the induction voltage and the estimated induction voltage, and generating the estimated angular velocity;

a controller for receiving the estimated angular velocity and the velocity command value inputted by a user and controlling the speed of the synchronous reluctance motor through the inverter.

7. The apparatus of claim 6, wherein the estimated induction voltage generator comprises:

an inductance operator for receiving the currents corresponding to 'd' axis and 'q' axis and the previous estimated angular velocity and operating inductances corresponding to 'd' axis and 'q' axis; and an estimated induction voltage operator for receiving inductances corresponding to 'd' axis and 'q' axis and operating the estimated induction voltage.

8. The apparatus of claim 6, wherein the estimated velocity generator comprises:

a comparator for receiving the induction voltage and the estimated induction voltage and generating an error induction voltage; and a proportional integral controller for receiving the error induction voltage and generating an estimated angular velocity.

9. The apparatus of claim 1, further comprising a magnetic flux operator for receiving the estimated angular velocity, operating a magnetic flux, and outputting it to the current detecting unit.

10. The apparatus of claim 1, wherein the detecting unit generates the estimated angular velocity by using the difference of reluctances corresponding to 'd' axis and 'q' axis of the rotor of the synchronous reluctance motor.

11. The apparatus of claim 10, wherein the reluctance is generated when the rotor of the synchronous reluctance motor is rotated.

12. A speed control method of a synchronous reluctance motor comprising the steps of:

detecting a current supplied to a synchronous reluctance motor;

detecting a voltage supplied to the synchronous reluctance motor;

operating an induction voltage generated by operating the detected current and an estimated induction voltage generated from the current, and generating an estimated angular velocity of the synchronous reluctance motor based on the induction voltage; and controlling the speed of the synchronous reluctance motor according to the estimated angular velocity and a velocity command value inputted by a user.

13. The method of claim 12, wherein, in the step of detecting a current, currents corresponding to 'd' axis and 'q' axis of the rotor of the synchronous reluctance motor are detected.

14. The method of claim 12, wherein, in the step of detecting a voltage, voltages corresponding to 'd' axis and 'q' axis of the rotor of the synchronous reluctance motor are detected.

15. The method of claim 12, wherein the step of generating an estimated angular velocity comprises:

operating currents corresponding to 'd' axis and 'q' axis and voltages corresponding to 'd' axis and 'q' axis of the rotor of the synchronous reluctance motor and generating an induction voltage;

operating the currents corresponding to 'd' axis and 'q' axis and the previous estimated angular velocity, and generating an estimated induction voltage; and operating the induction voltage and the estimated induction voltage, and generating an estimated angular velocity.

16. The method of claim 15, wherein the step of generating an estimated induction voltage comprises:

operating the currents corresponding to 'd' axis and 'q' axis and the previous estimated angular velocity, and operating inductances corresponding to 'd' axis and 'q' axis; and receiving the operated 'd' axis and 'q' axis and operating an estimated induction voltage.

17. The method of claim 15, wherein the step of generating an estimated angular velocity comprises:

operating the induction voltage and the estimated induction voltage and generating an error induction voltage; and proportionally integrating the error induction voltage.

* * * * *